United States Patent
Elliott et al.

(10) Patent No.: US 6,293,027 B1
(45) Date of Patent: Sep. 25, 2001

(54) DISTORTION MEASUREMENT AND ADJUSTMENT SYSTEM AND RELATED METHOD FOR ITS USE

(75) Inventors: Lee E. Elliott, Torrance; Michael K. MacKay, Palos Verdes Estates; John V. Flannery, Redondo Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/309,554

(22) Filed: May 11, 1999

(51) Int. Cl.$^7$ .................................................. G01B 11/24
(52) U.S. Cl. .................................. 33/546; 33/547; 33/286
(58) Field of Search ............................. 33/546, 286, 203, 33/203.18, 545, 547, 549, 551; 382/152, 153, 286, 287

(56) References Cited

U.S. PATENT DOCUMENTS

| | | | |
|---|---|---|---|
| 3,790,276 | * | 2/1974 | Cook et al. ........................ 356/141.3 |
| 3,803,626 | * | 4/1974 | Garrett ................................. 343/894 |
| 4,086,808 | * | 5/1978 | Camac et al. .......................... 73/655 |
| 4,843,397 | * | 6/1989 | Galati et al. ........................... 342/59 |
| 4,889,425 | * | 12/1989 | Edwards et al. .................. 356/141.3 |
| 4,934,063 | * | 6/1990 | Speisser ................................. 33/608 |
| 5,000,567 | * | 3/1991 | Fleshner .............................. 356/28.5 |
| 5,207,003 | * | 5/1993 | Yamada et al. ......................... 33/293 |
| 5,220,406 | * | 6/1993 | Kishner ................................. 356/360 |
| 5,455,670 | * | 10/1995 | Payne et al. ........................... 356/5.1 |
| 5,506,641 | * | 4/1996 | Dorsey-Palmateer .................. 353/28 |
| 5,589,928 | * | 12/1996 | Babbitt et al. ........................ 356/4.1 |
| 5,742,385 | * | 4/1998 | Champa ............................. 356/141.4 |
| 5,831,719 | * | 11/1998 | Berg et al. ........................... 356/5.13 |
| 6,087,645 | * | 7/2000 | Kitajima et al. .................... 250/203.1 |

\* cited by examiner

*Primary Examiner*—Diego Gutierrez
*Assistant Examiner*—Lydia M. DeJesús
(74) *Attorney, Agent, or Firm*—Robert W. Keller

(57) ABSTRACT

A technique for measuring distortion in a structure of interest, such as a spacecraft antenna reflector (18), and optionally compensating for the distortion. A first set of targets (22) on the structure (18) is scanned by an attitude transfer system (24) to measure the angular location and range of each target relative to a reference point on another structure (12) having a frame of reference. The orientation of the structure of interest is them determined from the measured locations of the targets. A second set of targets (60 or 82) on the structure of interest is scanned by a figure sensing module (26) located at a reference point on the structure itself. From measured angular locations and ranges of the second set of targets, any shape distortion in the structure of interest can be determined, and distortion may be corrected with the use of actuators (98).

4 Claims, 5 Drawing Sheets

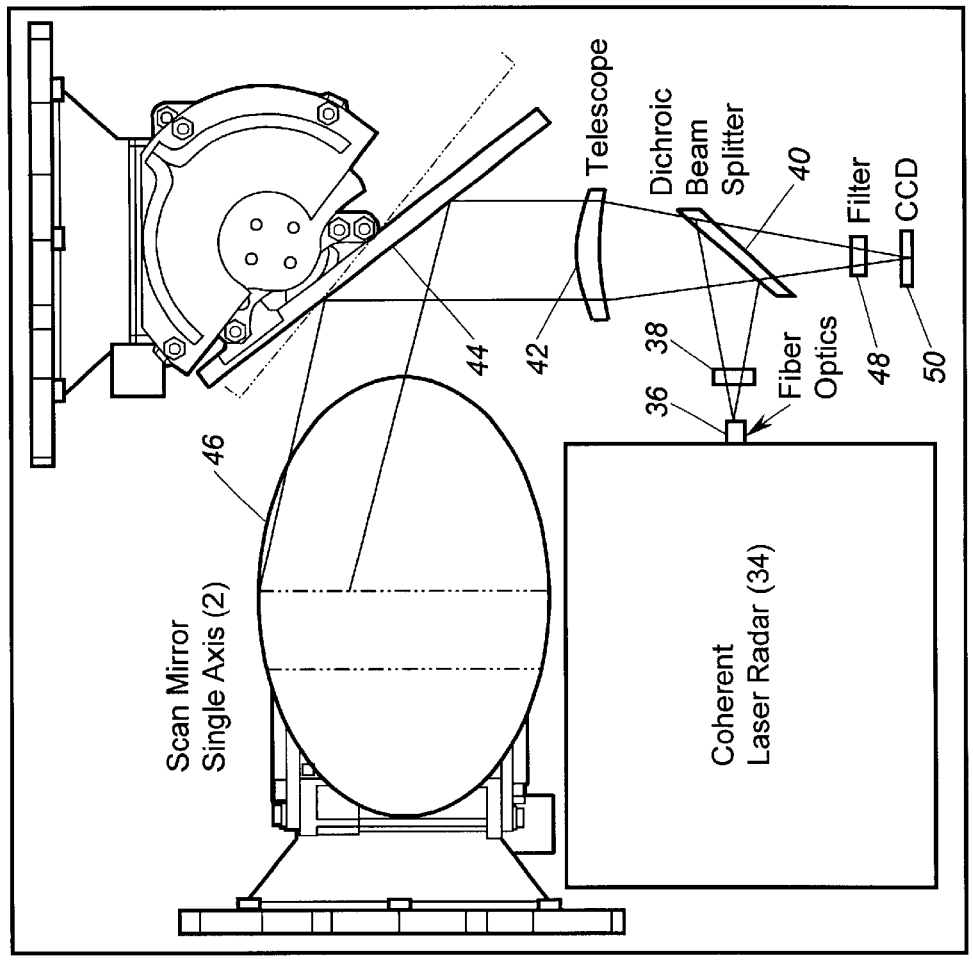
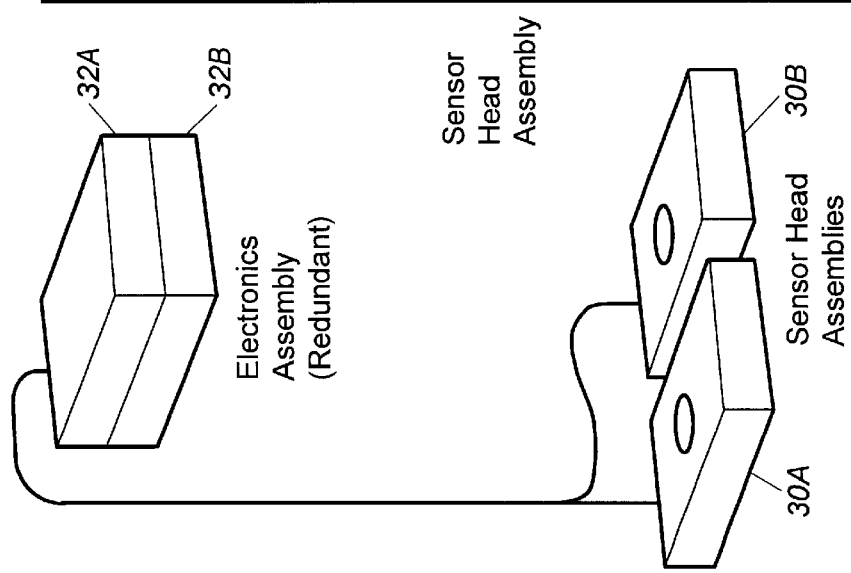
Figure 3B
Figure 3A

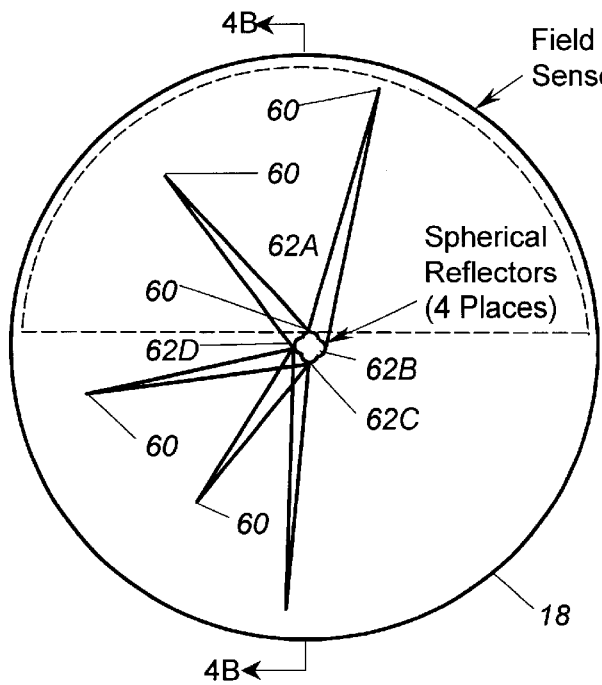
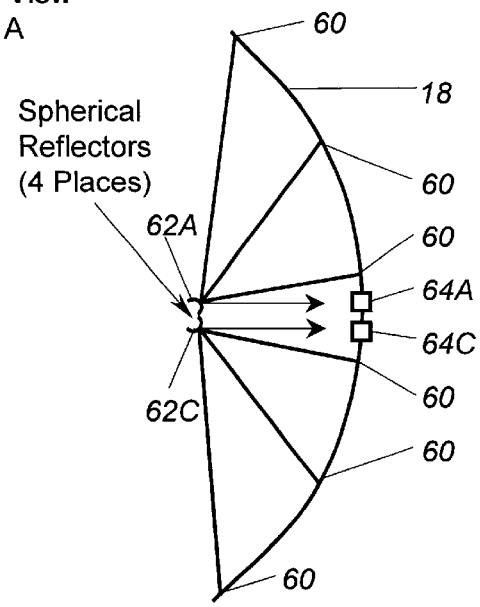
Figure 4A
Figure 4B
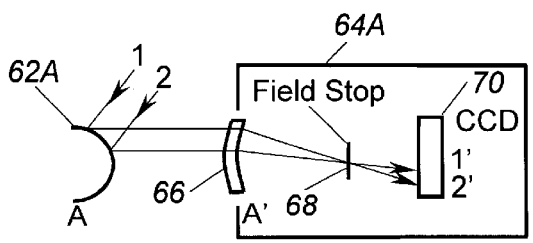
Figure 4C
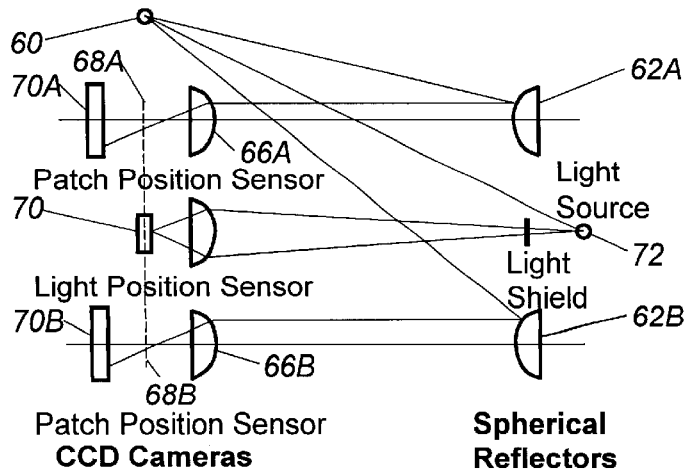
Figure 4D

DISTORTION MEASUREMENT AND ADJUSTMENT SYSTEM AND RELATED METHOD FOR ITS USE

BACKGROUND OF THE INVENTION

This invention relates generally to distortion measurement systems and, more particularly, to distortion measurement of spacecraft structures in applications that require extremely precise dimensional relationships. Many spacecraft have a significant problem in that their on-orbit shape may be distorted from an ideal desired shape. The differences may be due to thermal distortion, manufacturing tolerances, alignment tolerances, deployment tolerances, or other sources. Distortions in shape can cause performance degradation in spacecraft applications that depend on precise dimensional relationships. For example, the spacing of antenna elements or other sensors may be critical to the results obtained in a particular application. In most cases, this degradation in performance could be corrected if the distortions could be accurately measured. If accurate measurements could be obtained, the effects of distortion could be removed either by calibration, i.e., by making adjustments to resultant data on the spacecraft or on the ground, or by shape adjustment using on-board actuators. Prior to the present invention, spacecraft structures for which distortion is a known problem have been designed to be as near to distortion-free as possible. In most cases, this approach imposes a penalty of increased weight and cost.

Although the problem and its solutions are described in this specification in relation to a spacecraft application, it will be readily understood that distortion measurement problems may also arise in other contexts. It will appreciated from the foregoing that there is a need for a system that can measure distortion, particularly of spacecraft structures, and make appropriate adjustments. The current invention proposes a unique way for measuring spacecraft distortions and making the appropriate adjustments to improve alignment and/or structural distortions. This unique method allows the measurements to be made rapidly enough to measure and correct dynamic distortions and also allows the more efficient use of limited illumination capability.

SUMMARY OF THE INVENTION

The present invention pertains to a system and a corresponding method for its use, for measuring distortion of a structure of interest, such as a spacecraft in orbit, and for making appropriate adjustments to compensate for the distortion. Briefly, and in general terms, the system of the invention comprises a plurality of targets affixed to the structure of interest; at least one target scanning module affixed to a reference point with respect to the structure of interest, wherein the target scanning module includes means for measuring a range and an angular position for each of the targets; and means for computing distortion measurements pertaining to the structure of interest from the measured ranges and angular positions of the targets.

More specifically, the system includes a first target scanning module for measuring the orientation of the structure of interest relative to a frame of reference, and a second target scanning module for measuring the shape of the structure of interest. Optionally, the system further comprises a plurality of actuators controllable to compensate for measured distortions in the structure of interest.

The invention may also be defined as a system for measuring distortion of a spacecraft structure of interest, the system comprising a first set of targets affixed to the spacecraft structure of interest; a first target scanning module affixed to a reference point on a frame of reference independent of the spacecraft structure of interest, wherein the first target scanning module includes means for measuring a range and an angular position for each of the first set of targets; means for computing the orientation of the spacecraft structure of interest relative to the frame of reference, from the measured ranges and angular positions of the first set of targets; a second set of targets affixed to the spacecraft structure of interest; a second scanning module affixed to a reference point on the spacecraft structure of interest, wherein the target scanning module includes means for measuring a range and an angular position for each of the second set of targets with respect to the reference point; and means for computing shape distortion measurements pertaining to the spacecraft structure of interest from the measured ranges and angular positions of the second set of targets. The system may further comprise a plurality of actuators controllable to compensate for shape distortion of the spacecraft structure of interest.

In the disclosed embodiment of the invention, the first scanning module includes a laser radar module and a pair of scan mirrors controllable to direct a laser beam from the laser radar module toward successive members of the first set of targets. The second scanning module includes a light source and a plurality of light-sensing cameras for detecting the angular positions of the second set of targets, from a direction of arrival of light emanating from the light source and reflected from the targets. The position of each of the second set of targets is determined by triangulation based on receipt of light from each target by at least two of the light-sensing cameras. Alternatively, the second scanning module includes a laser ranging module providing a laser beam; means for scanning the laser beam across members of the second set of targets; and means for determining the positions of the members of the second set from measured ranges and angular locations of the targets.

The invention may also be defined in terms of a method for measuring distortion of a structure of interest, the method comprising the steps of affixing a plurality of targets to the structure of interest; scanning the targets with at least one target scanning module affixed to a reference point with respect to the structure of interest; measuring a range and an angular position for each of the targets; and computing distortion measurements pertaining to the structure of interest from the measured ranges and angular positions of the targets. More specifically, the scanning step includes scanning with a first target scanning module for measuring the orientation of the structure of interest relative to a frame of reference, and scanning with a second target scanning module for measuring the shape of the structure of interest. The method may also include controlling a plurality of actuators to compensate for measured distortions in the structure of interest.

As applied to spacecraft structures, the method of the invention comprises the steps of affixing a first set of targets to a spacecraft structure of interest; scanning the first set of targets with a first target scanning module affixed to a reference point on a frame of reference independent of the spacecraft structure of interest, wherein the scanning step includes measuring a range and an angular position for each of the first set of targets; computing the orientation of the spacecraft structure of interest relative to the frame of reference, from the measured ranges and angular positions of the first set of targets; affixing a second set of targets to the spacecraft structure of interest; scanning the second set of targets with a second scanning module affixed to a reference point on the spacecraft structure of interest, wherein the scanning step includes measuring a range and an angular position for each of the second set of targets with respect to the reference point; and computing shape distortion measurements pertaining to the spacecraft structure of interest from the measured ranges and angular positions of the second set of targets. The method may also include controlling a plurality of actuators to compensate for shape distortion of the spacecraft structure of interest.

The step of scanning with the first scanning module includes actuating a laser radar module; and controlling a pair of scan mirrors to direct a laser beam from the laser radar module toward successive targets in the first set of targets. The step of scanning with the second scanning module includes actuating a light source; and detecting in a plurality of light-sensing cameras the angular positions of the second set of targets, from a direction of arrival of light emanating from the light source and reflected from the targets. The position of each of the second set of targets is determined by triangulation based on receipt of light from each target by at least two of the light-sensing cameras. Alternatively, the step of scanning with second scanning module includes actuating a laser ranging module providing a laser beam; scanning the laser beam across members of the second set of targets; and determining the positions of the members of the second set from measured ranges and angular locations of the targets.

It will be appreciated from the foregoing that the present invention represents a significant advance in the field of distortion measurement, especially as applied to spacecraft structures. In particular, the invention provides for automatic measurement of shape distortion and orientation distortion of a structure of interest, by scanning targets affixed to the structure, measuring ranges and angular positions of the targets relative to a reference point, and then determining shape distortion and orientation with respect to the reference point. Other aspects and advantages of the invention will become apparent from the following more detailed description, taken in conjunction with the accompanying drawings.

BRIEF DESCRIPTION OF THE DRAWINGS

FIG. 3A is a diagrammatic view showing physical attributes of an attitude transfer system, including two sensor head assemblies and two electronics assemblies;

FIG. 3B is an enlarged plan view of one of the sensor head assemblies of FIG. 3A;

FIG. 4A is a diagrammatic plan view of an antenna reflector taken along its longitudinal axis and showing principal components of a figure sensor module;

FIG. 4B is a diagrammatic elevational view of the antenna reflector of FIG. 4A, taken generally in a direction indicated by line 4B—4B;

FIG. 4C is a diagram of one of four telescopes that form part of the figure sensor module;

FIG. 4D is a diagram depicting operation of the figure sensing module to detect positions of multiple targets on the antenna reflector;

DESCRIPTION OF THE PREFERRED EMBODIMENT

Figure 1:
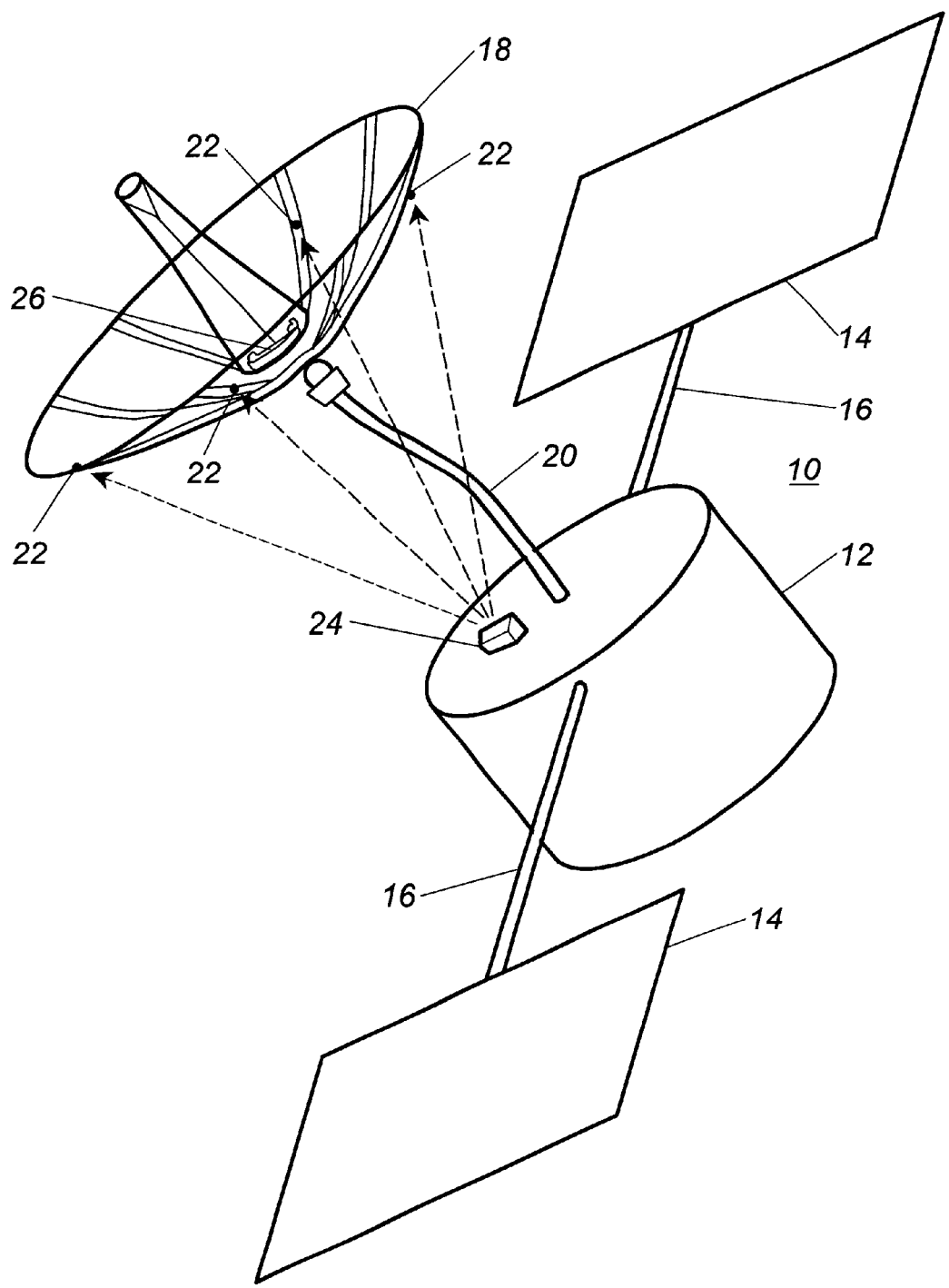
FIG. 1 is a diagrammatic view of a spacecraft in orbit, depicting one application of the distortion measurement system of the invention.

As shown in the drawings for purposes of illustration, the present invention pertains to a distortion measurement system that is disclosed in the context of a spacecraft. Some applications of spacecraft require very precise dimensional accuracy of components, such as an antenna array, but spacecraft are subject to unwanted distortion due to thermal and other sources. Without compensation for the distortion, performance will be degraded. An essential part of any technique to compensate for distortion is a distortion measurement system.

In accordance with the present invention, a measurement system provides an accurate measure of distortion of a spacecraft component, as will now be described in detail. FIG. 1 shows a spacecraft, indicated generally by reference numeral 10, shown as including a generally cylindrical body 12, two solar arrays 14 deployed on booms 16, and a large parabolic antenna reflector 18 deployed at the end of an articulated and inherently flexible boom 20. The antenna reflector 18 may be commanded to a specific pointing direction by means of control signals applied to the articulated boom 20, but the actual pointing direction or attitude of the reflector may not be precisely known because of possible distortions in the articulated boom 20. The antenna reflector 18 has a plurality of targets 22 affixed to its underside facing the body 12 of the spacecraft 10. Each of the targets 22 is within direct view of an attitude transfer module (ATM) 24 located on the end of the spacecraft body 12 closest to the antenna reflector 18. As will become apparent as this description proceeds, the basic function of the ATM 24 is to sense the rigid body attitude of a payload structure, such as the antenna reflector 18, relative to a reference point displaced from the payload structure of interest. In this example, the ATM 24 is located on the spacecraft body 12, in which is normally housed a spacecraft attitude reference system. Thus the ATM 24 senses the attitude or orientation of the antenna reflector 18 relative to the attitude reference system of the spacecraft body 12.

Another basic component of the distortion measurement system is a figure sensor module (FSM) 26, the function of which is to measure the shape of the payload structure of interest, i.e., the shape of the antenna reflector 18. How this is accomplished will be explained with reference to FIGS. 3–5. In summary, then, the ATM 24 provides a measure of the attitude of the antenna reflector 18 relative to the spacecraft attitude reference system, including any distortion of the articulated boom 20, while the FSM 26 provides a measure of the shape of the antenna reflector, including any unwanted distortions in the shape. Depending on the application in which the measurements are used, either or both of these categories of measurement may be important.

Figure 2:
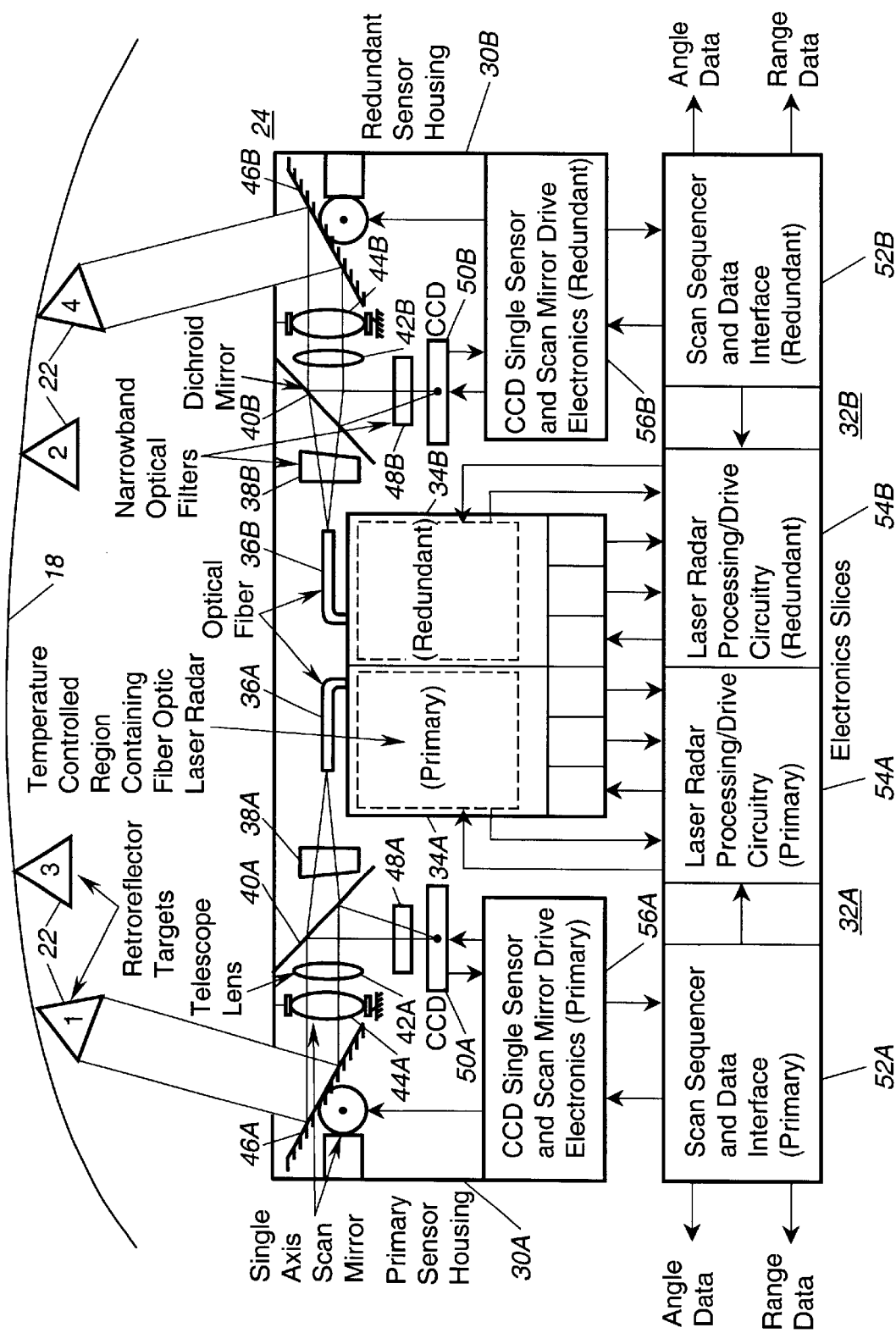
FIG. 2 functional block diagram of an attitude transfer system, which is a principal component of the distortion measurement system of the invention.

The functions of the ATM 24 are best understood by reference to FIG. 2, which shows the targets 22 in relation to the ATM 24. The ATM 24 includes dual sensor assemblies 30A and 30B and dual electronics assemblies 32A and 32B. For simplicity, each of the components of the ATM 24 will be referred to without the suffix A or B, but it will be understood that, as indicated in the drawings, there are identical components in the two sensor assemblies 30 and in the two electronic assemblies 32. Each sensor assembly 30 has a laser radar beam source 34, which generates a laser beam that is appropriately directed through an optical fiber 36. The beam passes through narrowband optical filters 38 and then through a dichroic mirror 40 and a telescope lens 42. The beam is then controllably reflected by two single-axis scan mirrors 44 and 46, which are rotated to deflect the beam along a desired path in three-dimensional space. When the beam impinges on one of the retroreflector targets 22, it retraces its path back to the dichroic mirror 40, which reflects the return beam through another optical filter 48 and into a charge-coupled device (CCD) camera 50, which senses the returning beam. The electronics modules that control the ATM 24 include a scan sequencer and data interface 52, laser radar processing and drive circuitry 54, and CCD single sensor and scan mirror drive electronics 56.

The physical arrangement of the principal ATM 24 components is shown in FIGS, 3A and 3B. FIG. 3A depicts the sensor assemblies 30A and 30B shown in side-by-side positions, and the electronics assemblies 32A and 32B shown in a stacked configuration, which can be located at any convenient point near the sensor assemblies. FIG. 3B is a plain view of one of the sensor assemblies 30. The two scan mirrors 44 and 46 are clearly visible, oriented such that the laser beam emanates from the top of the assemblies as depicted in FIG. 3A. In the embodiment shown, the sensor assembly is housed in a rectangular box with approximate dimensions 7 inches×7 inches×4 inches (17.8 cm×17.8 cm×10.2 cm).

In operation, the two sets of scan mirrors 44 and 46 are used in a time-multiplexed sequential operation in which one set of mirrors is performing angle and range measurements with respect to one of the targets 22 while the other set is being slewed to a new target. By measuring the angle and range of each of the four targets 22, the ATM 24 obtains four position vector measurements between the reference point where the ATM is located and a reference plane associated with the payload support structure. These vector measurements can be processed in a variety of ways to obtain the required attitude data. In the presently preferred embodiment of the invention, the ATM 24 further processes the measurements by forming difference vectors between the position measurements, and then computing vector cross products between the difference vectors. Each vector cross product, after normalization, provides a redundant measurement of a unit vector defining the orientation of the payload reference plane. The measured orientation of the antenna reflector 18 may, depending on the application involved, be used to compute control signals adjust the articulated boom 20 to correct the orientation to some desired value.

As mentioned earlier, the figure sensor module (FSM) 26 takes measurements of the shape of the payload structure of interest, in this case the antenna reflector 18. FIGS. 4A, 4B, 4C and 4D illustrate a photogrammetry approach to shape measurement, wherein the FSM 26 takes shape measurements with respect to a central antenna feed tower on the antenna reflector 18. As shown in FIGS. 4A and 4B, multiple targets 60 are located on the surface of the antenna reflector 18. The targets 60 take the form of light-reflective patches, and there may be as many as a hundred or more of them, depending on the application and its requirements for shape measurement. Located at the center of the antenna reflector 18 and elevated above its surface are four spherical reflectors 62A, 132B, 62C and 62D, oriented generally at ninety degrees to each other. The spherical reflectors 62 receive light reflected from the target patches 60 and reflect it into four corresponding telescope assemblies 64A, 64B, 64C and 64D located at a central location on the surface of the antenna reflector 18. FIG. 4C shows one of the telescope assemblies 64 receiving light from one of the spherical reflectors 62, through an appropriate lens 66 and field stop 68. The resultant light beam impinges on a CCD camera array 70, which detects the relative angular position of a target 60 from the directions of multiple beams striking the spherical reflector 62.

Because each spherical reflector 62 provides a field of view of practically an entire hemisphere, the coverage provided by adjacent reflectors 62 will overlap and light from any one target patch 60 will be detected by two reflectors 62 and two corresponding telescope assemblies 64. FIG. 4D depicts diagrammatically how light from a reflective patch 60 is detected in two CCD arrays 70. The light from the reflective patch 60 is derived from a light source 72, the position of which is also monitored by a CCD array 70. Using a simple triangulation principle, the FSM 26 determines the relative positions of multiple points on the surface of the antenna reflector 18, and from this information determines the entire shape or profile of the reflector. The shape of the reflector 18 may be adjusted by actuators (not shown in FIGS. 4A–4D) located at the rear face of the reflector and movable to compensate directly for detected distortion in the antenna reflector 18. Alternatively, the measured distortions in the shape of the reflector 18 may be used in processing of the antenna data, to provide calibration by data manipulation instead of by hardware adjustment.

Figure 5A:
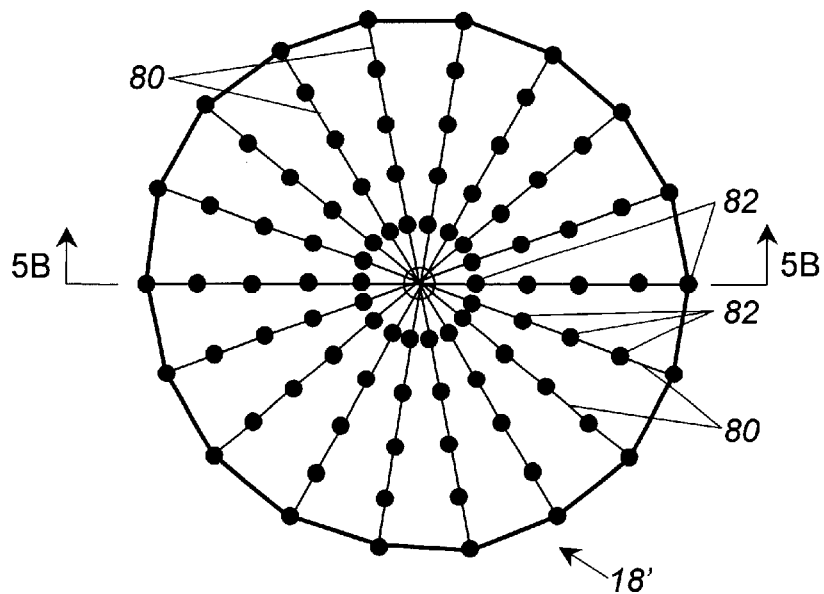
FIG. 5A is a diagrammatic plan showing target points on an antenna reflector, in accordance with an alternate embodiment of the figure sensor module of the invention.
Figure 5B:
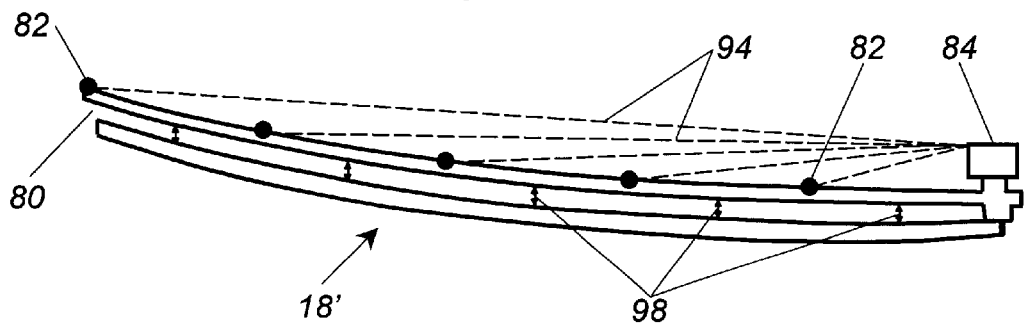
FIG. 5B is a fragmentary elevational view of the antenna reflector of FIG. 5A, taken generally in a direction indicated by line 5B—5B.
Figure 5C:
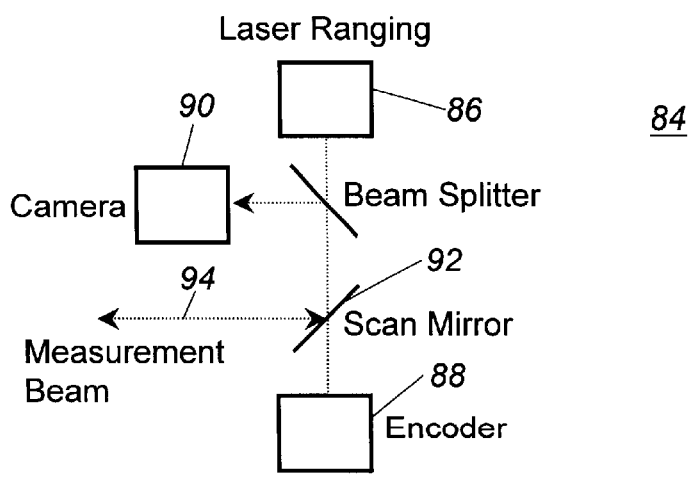
FIG. 5C is a functional block diagram of a sensor in FIG. 5B.

FIGS. 5A, 5B and 5C illustrate an alternate embodiment of the FSM 26. The antenna reflector, indicated at 18' has a number of uniformly spaced ribs 80 radiating from its geometric center as indicated in FIG. 5A. Spaced along each rib 80 is a series of rib target points 82, in the form of small retroreflectors. Located at the center of the antenna reflector 18' is a sensor/scanner assembly 84. As shown in FIG. 5C, the assembly 84 incorporates a laser ranging device 86 to measure the range of each scanned target point 82, a precision encoder 88 and a CCD camera 90. The laser ranging device 86 generates a laser beam that is reflected by a mirror scanning system 92, as indicated by the possible beam paths 94 to the targets 82. The mirror scanning system 92 includes two single-axis scanning mirrors similar to those shown in FIGS. 2 and 3B, to control the beam direction in three dimensions, under direction of the precision encoder 88. The camera 90 records the occurrence of a return beam from the targets 82. From the ranges and angular locations of the targets 82, the FSM 26 can determine the actual shape of the antenna reflector 18.

The sensor/scanner assembly 84, therefore, provides angle and range data for each of the target points 82 and from this information the shape of the antenna reflector 18 can be readily determined. Actuators 98 may also be included to correct the shape to a desired shape on a continuing basis.

For the case in which it is desired to adjust the shape of a statically indeterminate structure, the actuator commands are calculated using a weighted least squares (or other method) minimization of the distortion error. Such methods require a set of measured or calculated influence coefficients. Influence coefficients define how the shape is changed when each actuator is commanded. Ideally, for the best results to be obtained the influence coefficients should be measured in orbit. To do this effectively, the measurement system must be appreciably more accurate than the desired surface accuracy. Many large area indeterminate structures have non-linearities, due to hysteresis, stiffness, pre-load or other effects, and the non-linearities affect the influence coefficients and the convergence of the adjustment process. The effect of these non-linearities may be minimized by using an incremental sequential adjustment process. This process consists of first measuring the influence coefficients and then adjusting the actuators to correct the shape only partially, and then repeating these steps until the shape is within a desired tolerance range. This method improves the convergence of the adjustment process by confining each adjustment to a range in which the change in the influence coefficients is minimal.

It will be appreciated from the foregoing that the present invention represents a significant advance in the field of distortion measurement and compensation. In particular, the invention provides a technique for measuring distortions in shape and departures in orientation of a structure. The measurements can be used to determine corrections to data obtained using the structure, or to apply shape and/or orientation corrections directly to the structure. It will also be appreciated that, although a limited number of embodiments have been described in detail for purposes of illustration, various modifications may be made without departing from the spirit and scope of the invention. Accordingly, the invention should not be limited except as by the appended claims.

What is claimed is:

1. A system for measuring distortion of a spacecraft structure of interest, the system comprising:

a first set of targets affixed to the spacecraft structure of interest;

a first target scanning module affixed to a reference point on a frame of reference independent of the spacecraft structure of interest, wherein the first target scanning module includes means for measuring a range and an angular position for each of the first set of targets;

means for computing the orientation of the spacecraft structure of interest relative to the frame of reference, from the measured ranges and angular positions of the first set of targets;

a second set of targets affixed to the spacecraft structure of interest;

a second scanning module affixed to a reference point on the spacecraft structure of interest, wherein the target scanning module includes means for measuring a range and an angular position for each of the second set of targets with respect to the reference point; and means for computing shape distortion measurements pertaining to the spacecraft structure of interest from the measured ranges and angular positions of the second set of targets;

wherein the first scanning module includes a laser radar module, and a pair of scan mirrors controllable to direct a laser beam from the laser radar module toward successive targets in the first set of targets to obtain range and angular position data for each target in the first set of targets;

and wherein the second scanning module includes a light source, and a plurality of light-sensing cameras for detecting the angular positions of the second set of targets, from a direction of arrival of light emanating from the light source and reflected from the targets;

and wherein the position of each of the second set of targets is determined by triangulation based on receipt of light from each target by at least two of the light-sensing cameras.

2. A system as defined in claim 1, and further comprising:

a plurality of actuators controllable to compensate for shape distortion of the spacecraft structure of interest.

3. A method for measuring distortion of a spacecraft structure of interest, the system comprising the steps of:

affixing a first set of targets to the spacecraft structure of interest;

scanning the first set of targets with a first target scanning module affixed to a reference point on a frame of reference independent of the spacecraft structure of interest, wherein the scanning step includes measuring a range and an angular position for each of the first set of targets;

computing the orientation of the spacecraft structure of interest relative to the frame of reference, from the measured ranges and angular positions of the first set of targets;

affixing a second set of targets to the spacecraft structure of interest;

scanning the second set of targets with a second scanning module affixed to a reference point on the spacecraft structure of interest, wherein the scanning step includes measuring a range and an angular position for each of the second set of targets with respect to the reference point; and computing shape distortion measurements pertaining to the spacecraft structure of interest from the measured ranges and angular positions of the second set of targets;

wherein the step of scanning with the first scanning module includes actuating a laser radar module, and controlling a pair of scan mirrors to direct a laser beam from the laser radar module toward successive targets in the first set of targets;

and wherein the step of scanning with the second scanning module includes actuating a light source, and detecting in a plurality of light-sensing cameras the angular positions of the second set of targets, from a direction of arrival of light emanating from the light source and reflected from the targets;

and wherein the position of each of the second set of targets is determined by triangulation based on receipt of light from each target by at least two of the light-sensing cameras.

4. A method as defined in claim 1, and further comprising:

controlling a plurality of actuators to compensate for shape distortion of the spacecraft structure of interest.

* * * * *